US012589309B2

(12) United States Patent
Rudi et al.

(10) Patent No.: US 12,589,309 B2
(45) Date of Patent: Mar. 31, 2026

(54) TAILORING IN-GAME DIALOGUE TO PLAYER ATTRIBUTES

(71) Applicant: SONY INTERACTIVE ENTERTAINMENT INC., Tokyo (JP)

(72) Inventors: Olga Rudi, San Mateo, CA (US); Bethany Tinklenberg, San Mateo, CA (US); Mahdi Azmandian, San Mateo, CA (US); Hsin-Yi Chien, San Mateo, CA (US); Sarah Karp, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 296 days.

(21) Appl. No.: 18/232,529

(22) Filed: Aug. 10, 2023

(65) Prior Publication Data

US 2025/0050225 A1 Feb. 13, 2025

(51) Int. Cl.
| | |
|---|---|
| *A63F 13/79* | (2014.01) |
| *A63F 13/213* | (2014.01) |
| *A63F 13/215* | (2014.01) |
| *A63F 13/67* | (2014.01) |

(52) U.S. Cl.
CPC ............ *A63F 13/67* (2014.09); *A63F 13/213* (2014.09); *A63F 13/215* (2014.09); *A63F 13/79* (2014.09)

(58) Field of Classification Search
CPC ...... A63F 13/67; A63F 13/213; A63F 13/215; A63F 13/79
See application file for complete search history.

(56) References Cited

U.S. PATENT DOCUMENTS

| | | | |
|---|---|---|---|
| 10,713,543 B1 * | 7/2020 | Skuin | G06N 20/00 |
| 11,090,566 B1 | 8/2021 | Chow | |
| 2018/0243656 A1 * | 8/2018 | Aghdaie | A63F 13/67 |

(Continued)

OTHER PUBLICATIONS

"International Search Report and Written Opinion", issued by the United States Patent and Trademark Office, as International Searching Authority for PCT Application No. PCT/US2024/033448 on Nov. 27, 2024, 8 pages.

(Continued)

*Primary Examiner* — David L Lewis
*Assistant Examiner* — Shauna-Kay Hall
(74) *Attorney, Agent, or Firm* — Kilpatrick Townsend & Stockton LLP

(57) ABSTRACT

A system and method for providing a customized in-game interaction is disclosed. A plurality of different player attributes are stored in memory, each player attribute associated with a different pattern of in-game engagement and in-game customization in a virtual environment. Data sent over a communication network regarding one or more activity files associated with in-game engagement by a user of a user device with one or more non-playable characters in one or more game sessions are received. The activity files are analyzed to identify a pattern of engagement exhibited by the user with each of the non-playable characters. A player attribute are assigned to the user based on the determined pattern of engagement matching a stored pattern corresponding to the player attribute. A customized interaction with a non-playable character during a current game session with the user device are provided.

20 Claims, 5 Drawing Sheets

(56)           References Cited

U.S. PATENT DOCUMENTS

| | | | |
|---|---|---|---|
| 2020/0197811 A1 | 6/2020 | Eatedali et al. | |
| 2020/0206631 A1 | 7/2020 | Sumant et al. | |
| 2020/0282315 A1 | 9/2020 | Daniel | |
| 2021/0001229 A1* | 1/2021 | Somers | A63F 13/67 |
| 2022/0148248 A1 | 5/2022 | Mcintyre-kirwin et al. | |
| 2023/0038695 A1 | 2/2023 | Yee et al. | |
| 2023/0127685 A1 | 4/2023 | Yingling et al. | |
| 2023/0381665 A1* | 11/2023 | Dolan | A63F 13/795 |

OTHER PUBLICATIONS

Application No. PCT/US2024/033441, International Search Report and Written Opinion dated Sep. 18, 2024.

Application No. PCT/US2024/025315, International Search Report and Written Opinion dated Aug. 2, 2024.

Application No. PCT/US2024/025320, International Search Report and Written Opinion dated Aug. 7, 2024.

\* cited by examiner

200

210

Store information for various player attributes

220

Receive an activity file associated with in-game engagement

230

Analyze the activity file to identify a pattern of engagement

240

Assign a player attribute based on the pattern of engagement and stored player attributes

250

Provide a customized interaction with non-playable character

TAILORING IN-GAME DIALOGUE TO PLAYER ATTRIBUTES

BACKGROUND OF THE INVENTION

1. Field of the Invention

The present system generally relates to providing a customized in-game interaction. More specifically, the present system relates to tailoring in-game dialogues to a user of an entertainment device.

2. Description of the Related Art

Interactive experiences in video games and other interactive content titles may offer a wide variety of options relating to virtual environments, characters, objects, abilities, and actions. With increased hardware and software capabilities, modern games may utilize a vast quantity of different available environments, characters, and other storytelling devices to engage with a player. Such engagement and storyline progression may be driven by a player interacting with a non-player character (NPC) as an ally, an enemy, or in some other capacity where the interaction allows the experience to evolve or further the plot. Unlike player characters whose actions and dialogue are controlled by a player, NPC behaviors are generally based on game code and may therefore be predetermined in accordance with the game code.

Engagement with an NPC within a virtual environment of an interactive title during a session generally involves communication such as text-based or verbal exchanges, as well as in-game actions or behaviors (e.g., fighting, sparring, racing, competing or collaborating in other contests or challenges). Depending on theme or genre of the specific interactive content title, conversation between a player and an NPC may not only be functional (e.g., educational, mission- or goal-oriented), but can also range from trivial or humorous to heartfelt or dire. High-quality in-game animations, voice acting, and writing may be used to immerse the player in the virtual interaction with the objective of deepening the player's engagement and active participation in the virtual world. Providing the player with various options for how such interactions take place further emphasizes the impact and influence that the player has over the story and characters.

Despite advances in technology to deliver varied interactions, even the more diverse dialogue choices can appear restrictive or otherwise jarring to different players and detract from the immersive nature of the intended experience. Although some experiences may try to tailor the interaction options to reflect the personality of the player through other choices that have been made previously, NPC responses are generally sourced from a set of predefined phrases coded by the developer of the game. Such predefined phrases are generally not responsive to the specific personality, mood, or other attributes of the player, which may in themselves be challenging to discern and classify.

Therefore, there is a need in the art for providing a customized in-game interaction tailored to the attributes of the user.

SUMMARY OF THE CLAIMED INVENTION

Embodiments of the present invention include methods for providing a customized in-game interaction. A plurality of different player attributes are stored in memory, each player attribute associated with a different pattern of in-game engagement and in-game customization in a virtual environment. Data sent over a communication network regarding one or more activity files associated with in-game engagement by a user of a user device with one or more non-playable characters in one or more game sessions are received. The activity files are analyzed to identify a pattern of engagement exhibited by the user with each of the non-playable characters. A player attribute is assigned to the user based on the determined pattern of engagement matching a stored pattern corresponding to the player attribute. A customized interaction with a non-playable character during a current game session with the user device are provided.

Embodiments of the present invention include systems for providing a customized in-game interaction. The system includes a memory that may store a plurality of different player attributes, each player attribute associated with a different pattern of in-game engagement and in-game customization in a virtual environment. The system also includes a communication interface that may receive data sent over a communication network regarding one or more activity files associated with in-game engagement by a user of a user device with one or more non-playable characters in one or more game sessions. The system also includes a processor that executes instructions stored in memory that may analyze the activity files to identify a pattern of engagement exhibited by the user with each of the non-playable characters, assign a player attribute to the user based on the identified pattern of engagement matching a stored pattern corresponding to the player attribute; provide a customized interaction with a non-playable character during a current game session with the user device.

Embodiments of the present invention also include a non-transitory computer-readable storage medium having embodied thereon a program, the program being executable by a processor to perform a method for providing a customized in-game interaction. The method may also include storing a plurality of different player attributes in memory, each associated with a different pattern of in-game engagement and in-game customization. The method may also include receiving one or more activity files associated with in-game engagement by a user of a user device with one or more non-playable characters in one or more game sessions. The method may also include analyzing the activity files to identify a pattern of engagement exhibited by the user with each of the non-playable characters. The method may also include assigning a player attribute to the user based on the determined pattern of engagement matching a stored pattern corresponding to the player attribute. The method may also include providing a customized interaction with a non-playable character during a current game session with the user device.

DETAILED DESCRIPTION

Embodiments of the present invention include system and methods for providing a customized in-game interaction. A plurality of different player attributes may be stored in memory, each player attribute associated with a different pattern of in-game engagement and in-game customization in a virtual environment. Data sent over a communication network regarding one or more activity files associated with in-game engagement by a user of a user device with one or more non-playable characters in one or more game sessions are received. The activity files are analyzed to identify a pattern of engagement exhibited by the user with each of the non-playable characters. A player attribute is assigned to the user based on the determined pattern of engagement matching a stored pattern corresponding to the player attribute. A customized interaction with a non-playable character during a current game session with the user device are provided. Thus, customized in-game dialogue that recognizes the feelings or sentiments of a player towards an NPC—based not only on player dialogue, but also voice tonality, gestures, and other body language—may be provided based on the personality and other attributes of the player, thereby allowing for a more responsive and ultimately more fulfilling gaming experience.

Figure 1:
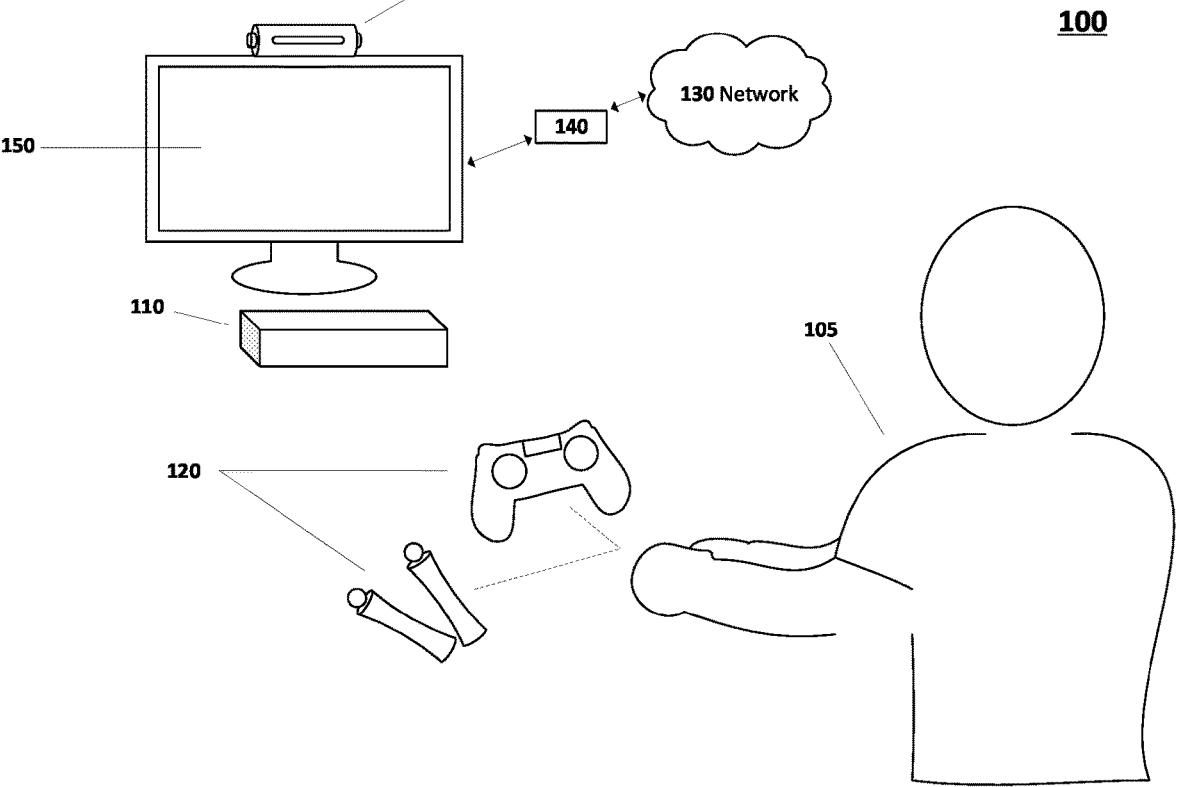
FIG. 1 illustrates a networked environment in which a system for tailoring in-game dialogue may be implemented.

FIG. 1 illustrates a networked environment 100 in which a system for tailoring in-game dialogue may be implemented. As shown, the networked environment 100 includes equipment such as a console 110, controller(s) 120, one or more sensors 125, and/or a display 150. The various devices, components, sub-components, hardware/software, interfaces, and the like in networked environment 100 collectively operate form an entertainment system that provides an immersive and interactive simulated experience to a user 105.

Console 110 represents centralized hardware and software that allow for communication with controller 120 and/or sensor 125, as well as communicates with various other devices, servers, databases, and the like over a communication network 130 (e.g., local area network, wide area network, the Internet), as is appreciated by those skilled in the art. In various embodiments, console 110 executes the instructions in accordance with a particular game title to establish and support a gameplay session, as well as provide associated services to user 105. Console 110 may include a user device and components thereof described in further detail with respect to FIG. 3.

Communication network 130 represents a network of devices/nodes interconnected over network interfaces/links/segments/etc. and operable to exchange data such as a data packet 140 and transport data to/from end devices/nodes (e.g., console 110, controller 120, and/or sensor 125). Data packets 140 include network traffic/messages which are exchanged between devices over communication network 130 using predefined network communication protocols such as certain known wired protocols, wireless protocols (e.g., IEEE 802.11, WiFi, Bluetooth®, etc.), PLC protocols, or other shared-media protocols where appropriate.

Controller 120 wirelessly communicates with console 110 over network 130, or (in some embodiments) it may be coupled to console 110 over another network (not shown). Controller 120 may include a virtual reality headset. Controller 120 facilitates user interaction with and within the networked environment 100 and is operable to, for example, detect, track, or otherwise monitor movement and biometric information, communicate data signals with sensor 125 and console 110, and provide feedback (e.g., tactile, audible, etc.) to a user 105. In this fashion, controller 120 can include any number of sensors, gyros, radios, processors, touch detectors, transmitters, receivers, feedback circuitry, and the like.

Sensors 125 may wirelessly communicate with console 110. Sensors 125 may track eye movements, appearance of the user, body movements, facial expressions, sounds and voice outputs from the user, and measure biometric data from user 105. Sensors 125 may include one or more cameras, microphones, accelerometers, gyroscopes, haptic feedback sensors, and other types of sensors 125 configured to monitor a real-world space in which a player may be interacting with an entertainment system. As such, the sensors 125 may be placed or located at various locations within the space, including locations in proximity to or embedded in the other devices or in proximity to or worn by the player.

Display 150 may display or project simulated graphical elements that form simulated environments to user 105. Display 150 may include a monitor, television, projection screens, another device screen, virtual reality headset, virtual reality projection systems, etc. Display 150 may display information provided from console 110, controller 120, sensor 125, and other data received via the network 130 from cloud servers, game servers, remote user devices associated with other players, and other remote devices.

With respect to the devices discussed above, it is appreciated that certain devices may be adapted to include (or exclude) certain functionality and that the components shown are shown for purposes of discussion, not limitation.

In exemplary implementations, console 110 may be used by user 105 to initiate and engage in an interactive session in relation to an interactive content title. Such interactive session may include gameplay with other user devices (e.g., other consoles 110) of other (remote) users over communication network 130, as well as facilitated by content host servers and/or other service providers. Where an interactive content title includes a storyline driven by one or more NPCs, each of the NPCs may be tailored to the attributes of specific user 105.

Where the user 105 may be a new player, the attributes of user 105 may initially be unknown. A user profile may be built for the user, however, based on historical and current activities that may be monitored by console 110 and associated devices. For example, some content titles may involve a registration, character creation, or other initialization processes during which user preferences may be requested or discerned. The feedback from the user—which may include not only express answers, but also associated non-verbal reaction data—may be stored in an associated user profile. In addition, various analytical techniques—such as image analyses, text analyses, voice analyses, gesture analyses—may be applied to the user profile to identify and classify sets of data indicative of particular user attributes. Social and interpersonal interactions may also be tracked by console 110 in relation to social networks and platforms, social subscriptions, fandom indicators, in-game interactions with other players, and associated demographic or profile data for the other players. Social or interpersonal interaction data may also provide a basis for extrapolating and classifying player attributes.

As the user 105 engages with interactive content via console 110, additional data regarding user selections and behaviors may be monitored and added to the user profile for use in modeling tailored NPC modifications. As such, the user profile may be continually updated with new user data, which may be used to refine pattern recognition and predictions by learning models associated with the user, including learning models trained to identify NPC modifications predicted to result in making an NPC more engaging to the user.

A learning model may be used to characterize the player attributes based on known language, regional dialects or accents, commonly-used turns of phrase, voice tones, gestures, and behaviors. Such model may be updated based on new characterization of language, gestures, and behaviors based on user feedback. The model may further utilize dictionary definitions, known tone words, previously defined player attributes from other games, or attributes as identified by or based on feedback from other players.

In addition, a player attribute may include sentiments and expressions thereof. For example, positive language such as "pretty" may indicate admiration. An excited tone of voice such as "wow!" or "cool beans!" may indicate enthusiasm. In another example, actions that skip dialogues or long text may be associated with impatient player attribute. In another example, the gestures of throwing hands up in the air, the sound of sighing, frowning may indicate an attribute of being annoyed.

Machine learning techniques (e.g., similar to those used by large language models trained using large data corpora to learn patterns and make predictions with complex data) may further be applied to train a model based on user data, including game data, which may be captured during gameplay sessions of the same or different users and user devices. Such game data may include not only information regarding the game titles being played, but also user profiles, chat communications (e.g., text, audio, video), captured speech or verbalizations, behavioral data, in-game actions, etc., associated with the gameplay session. Such game data may be monitored and stored in memory as object or activity files, which may be used for supervised and unsupervised learning whereby a model may be trained to recognize patterns between certain game/user data and associated user attributes, as well as to predict customizations that would tailor an NPC to be suitable for a particular user. In some implementations, sets of the object files or activity files may be labeled in accordance with any combination of game metadata and user feedback during or in association with gameplay sessions.

User feedback may indicate certain preferences or ways in which the NPC (e.g., appearance, manner of speech, behaviors, roles, and other ways in which they drive the storyline) may be further tailored to the liking of the user. Such user feedback may be used not only to tailor subsequent NPC interactions for sessions with the specific user, but also for sessions with users identified as sharing similar user attributes. Thus, the system may affirm such associations or patterns by querying a player for feedback on whether the NPC was likable, interesting, or seemed rude and utilize the user feedback to further update and refine the model, as well as monitoring associated or concurrent chat communications and sensor data regarding the user 105 to discern positive or negative reactions.

The machine learning model may thus be trained to process natural language communications (e.g., such as verbal, textual, etc.) in conjunction with available user data to identify NPC modifications to one or more characteristics utilizing input or feedback from the user, user characteristics, prior NPC modifications, one or more NPC parameters for the game title, data pertaining to one or more additional users, databases, etc. The identified modifications may thereafter be applied to virtual characteristics of the NPC, which may then be re-rendered and executed in a current or subsequent gameplay or interactive session. Different machine learning models may be trained using different types of data input, which may be specific to the user, the user demographic, associated game or other interactive content title(s) and genres thereof, social contacts, etc. Using the selected data inputs, therefore, the machine learning model may be trained to identify attributes of a specific user and identify NPC customization parameters that may be specifically relevant to the requesting user (e.g., female 10-year old child that plays dancing games, male 7-year old child that plays racing games, male 31-year old adult that plays horror-based games).

Identified user attributes may be associated with a different pattern of in-game engagement and in-game customization. A pattern of certain positive attitude or actions towards the character may be associated with the dialogue options that are equally positive actions available to engage with the NPC or otherwise expand on the continued engagement with the non-playable character. In contrast, a pattern of negative attitude or actions towards the NPC may be associated with dialogue options that allow the users to engage the NPC in a fight, throw objects at the NPC, or otherwise discontinue future engagement with the NPC. For example, attribute indicating admiration may be associated with in-game engagement that allows the players to hug the NPC, give the NPC a high-five gesture, or offer gifts to the NPC. Attributes indicating that the player is impatient may be associated with in-game engagement options that are brief and short in text.

Figure 2:
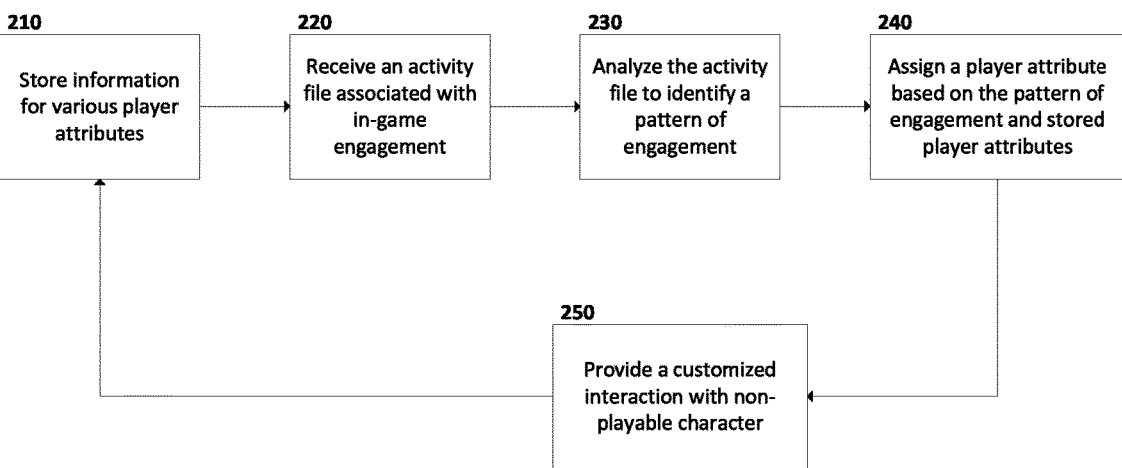
FIG. 2 is a flowchart illustrating an exemplary method for tailoring in-game dialogue or interactions with non-player characters (NPCs).

FIG. 2 is a flowchart illustrating an exemplary method for tailoring in-game dialogue or interactions with non-player characters (NPCs). The method 200 may be carried out by the networked environment 100 in FIG. 1, system 300 in FIG. 3 or server system 400 in FIG. 4. The method 200 2 may be embodied as executable instructions in a non-transitory computer readable storage medium including but not limited to a CD, DVD, or non-volatile memory such as a hard drive (which may also include downloaded or streamed instructions from remote systems). The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

The method 200 begins at step 210, in which the system stores information regarding a plurality of different player attributes in memory 305 or 430. Player attributes may characterize language, the tone of the voice, behavior, a course of action, or gestures as being associated with a certain emotional state, personality, affinity, or a propensity. Player attributes determined by the system 100 may be aggregated from various players and stored in a cloud system. A learning model may be trained to characterize the stored player attributes with the associated behaviors. Further, a certain predetermined course of action by an NPC, such as one or more dialogue options, may be associated with the player attribute.

In step 220, the system receives an activity file associated with in-game engagement of the user of a user device with one or more NPC. The user device may include console 110, controller 120, sensor 125, or display 150. The activity files may be data captured within the virtual game as well as in the real world during a game. The activity file may include detected in-game objects, entities, activities, and events that players have engaged with, and thus support analysis of and coordination with in-game engagement with the NPC. Each player interaction with the NPC may have metadata for the type of in-game interaction, location within the in-game environment, and point in time within an in-game timeline, as well as other players, objects, entities, among other data associated with gameplay. The activity file may also include data from sensors, such as the voice, tone, sound, gesture, physical movement, facial expression, and/or appearance of the user. The tracked activities of the user with one or more NPC in the activity files may be from the current game or from another game previously played by the user featuring the same NPCs.

The system may passively gather data on the activity of the user even when the user is not engaged with the NPC, not engaged with the current game, or the console 110 and store the data for analysis if the data regards to the attitude of the user towards an NPC. For example, the user may discuss how the user feels about the NPC with his friends while playing a different game. Such data may be stored either locally on console 110 or remotely in cloud storage accessible via communication network 130.

In step 230, the system analyzes the activity files to identify a pattern of engagement exhibited by the user with each of the NPC. The system may detect and aggregate repeated facial expression, speech, or body language indicative of similar attitude towards one of the NPCs. In analysis of the speech of the user, the system may determine the tone, sound, pitch, loudness, speed, accent (e.g., as indicated by a sound wave profile), and intent of the user from the word choice to indicate sarcasm, enthusiasm, anger, or calmness. The system may generate the sound wave profile by analyzing activity files to determine the voice characteristics of the user, which provides instructions on how to mimic or align the voice characteristics of virtual speech to the voice characteristics of the user. The pattern of engagement towards the NPC may include the manner, tone, volume, or pitch of the speech spoken by the user towards the NPC. For example, the user may use words such as "totally" "yea right" that are overemphasized, along with rolling of the eyes, which would indicate a pattern of behavior consistent with sarcasm. The pattern of engagement towards the NPC may further include the physical movement, gestures made by the user during the interaction with an NPC.

In step 240, a player attribute to the user in association with the NPC may be assigned based on the determined pattern of engagement with the NPC that is matching a stored pattern corresponding to the player attribute. For example, positive language such as "she is a cool character," along with the tone of voice such as "wow!" or cheering sound, which in aggregate may indicate admiration towards the non-playable character (NPC). In another example, repeated actions that skip dialogues with the NPC may indicate that the user is disinterested in the NPC. In another example, the gestures of throwing hands up in the air, the sound of sighing, furrowing of the eyebrows in aggregate may indicate that the user is annoyed with the NPC. In one embodiment, more than one player attributes may be simultaneously assigned to the user. For example, the user may be assigned that he is impatient and violent towards an NPC. Such reactions may be used to not only update the model as to the player's reactions and preferences, but also to modify subsequent dialogue and behaviors of the NPC or to trigger the appearance of a replacement NPC with different characteristics that may be more to the player's liking.

In another embodiment, one of the player attributes may be weighted more heavily than another attribute. There may be different instances of interactions with the NPC that are associated with contradictory attributes. In such a case, certain factors regarding the engagements may be weighted to favor one of the attributes to be assigned. Such factor may include recency of the engagement, number of engagements associated with each of the contradictory attributes, involvement with other NPCs in the interaction, or other conditions during which the engagement occurred.

For example, the user engaged with the NPC positively during the recent engagements, the attributes associated with positive interaction may be assigned over a contradictory, negative attribute. In another example, if the user had contradictory engagements with the NPC during a major quest as opposed to a minor quest, the interaction with the NPC during the major quest may be weighed more heavily. In another example, if the user skipped engagement with the NPC during an interaction involving the NPC as well as other NPCs but had positive engagement with the NPC when engaging the NPC alone, the engagement involving the NPC alone may weigh more heavily.

Different attributes may be assigned to different NPCs as the user may display different pattern of behaviors to each of the NPCs. In some implementations, the user may be observed or actively queried-either during or after the NPC interaction-so as to confirm the assigned player attribute when the pattern of engagement is contradictory or inconclusive. In some cases, patterns between the player-exhibited behaviors, attributes, and particular NPC modifications may be further refined or tailored to the specific player. For example, a smile from one player may indicate pleasure and happiness, while another player may smile from annoyance or malice. Different NPC modifications may therefore be identified for the different players who may exhibit similar behaviors that are reflective of different attributes.

The assigned player attribute to the user may be used to further update the learning model that characterizes the player attributes based on the associated behaviors. The updated learning model may further refine a future characterization of a user and provide a customized dialogue based on a determined player attribute.

In step 250, the system provides a customized interaction with the NPC during the current session of the game with the user device. The customization may include customizing parameters of the NPC to the user, including the NPC appearance, manner of speech, diction, pace of dialogue, and other actions and behaviors. For example, a user identified as a young child that likes animals may be presented with an NPC with the appearance of a puppy with the speech and behavior patterns associated with young children. In-game behaviors may also be modified for consistency whereby the NPC puppy may be displayed as chasing its tail or playing fetch while talking to the user. Such an NPC presented to a young child may also voice dialogue that is more direct or proactively helpful than an NPC presented to an adult identified as enjoying mystery or riddles.

Conversely, customization may include modifying the default actions available to the user with respect to the NPC to customized interactions associated with the player attribute of the user. The customized interactions may include certain actions to be taken with NPC, interacting with one or more objects around the NPC, modified dialogue of the NPC or the avatar of the user, modified script in the story involving the NPC, or modified length of engagement with the NPC. Customizations may also apply to user options for responding to the NPC, such as the default dialogue options for engagement with the NPC that would have been offered to the user may not reflect the player attribute of the user. In such a case, at least some of the default options available to the user would be replaced by the engagement options that are more palatable with the user based on the player attribute of the user. For example, the default dialogue options may have included A) asking NPC a question; B) insulting the NPC; C) dancing with the NPC. If the assigned player attribute is admiration, the dialogue options may be modified to A) offer a gift to the NPC; B) add the NPC as a companion; C) dancing with the NPC; D) learn more about this NPC. If the assigned player attribute is disgust, the dialogue option may be modified to A) punch the NPC; B) insulting the NPC; C) throwing an object at the NPC. In addition, the tonality of the dialogue option may vary based on the player attribute of the user.

In another embodiment, when the pattern of engagement is inconclusive as to be associated to one player attribute or if the pattern of engagement indicates two contradictory or opposite player attributes, dialogue options may be modified with each option associated with different player attribute. In another embodiment, where the pattern of engagement is conclusively associated with a player attribute, 3 of the dialogue options may be actions that the user may engage with the NPC consistent with the player attribute whereas one of the dialogue options may reflect an action associated with a different player attribute. The subsequent user selection of the one of the dialogue options may be used to further refine the player attribute associated with the NPC.

In another embodiment, the customization may include modifying the avatar of the user during the interaction with the NPC. The analyzed sound profile of the voice of the user included in the activity files may be used to modify the voice pattern of the avatar of the user such that the avatar speaks and sounds like the user when the avatar speaks to the NPC. The analyzed physical movement of the user in the activity files may be used to modify the movement of the avatar of the user in-game. The physical movement of the avatar of the user may be modified in sync of in conjunction with the modified voice pattern of the avatar. The appearance of the user in the activity files may be used to modify the appearance of the avatar of the user to look like the user.

Figure 3:
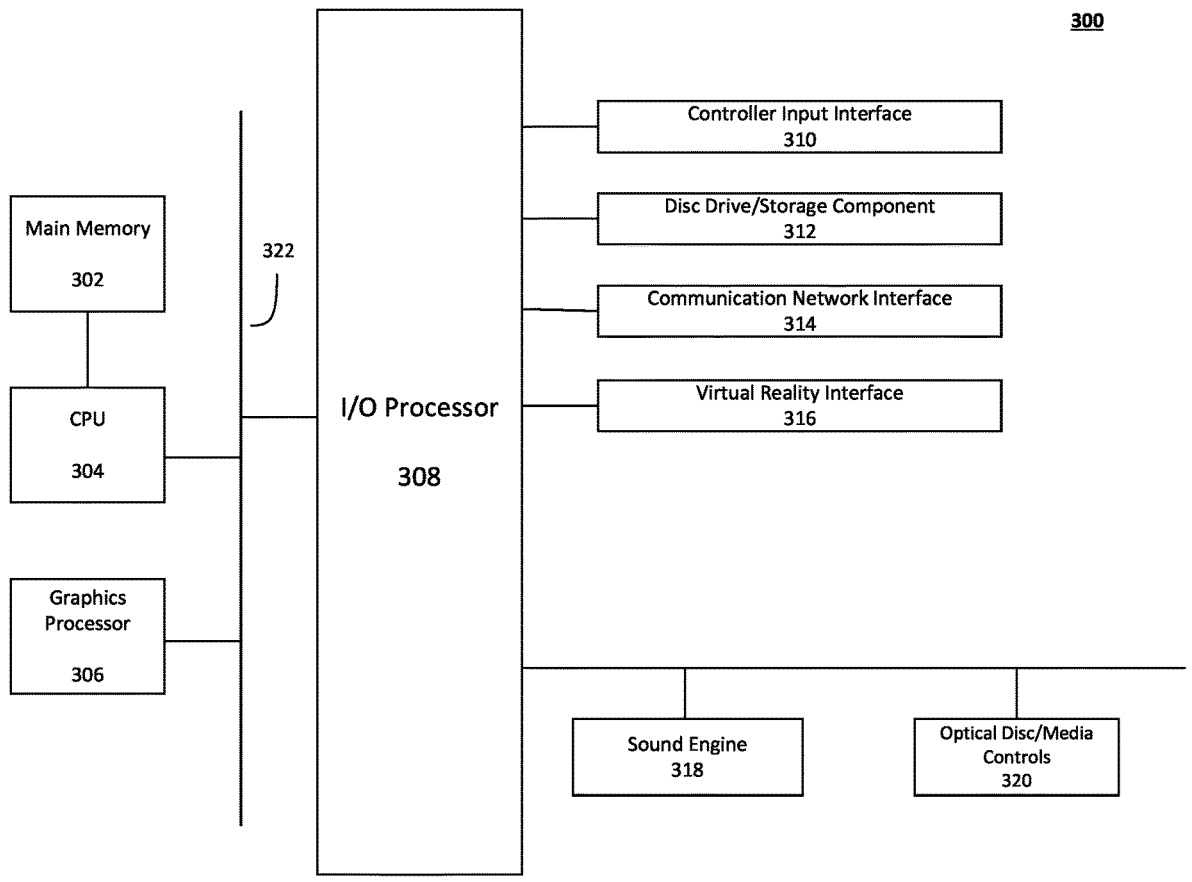
FIG. 3 illustrates a block diagram of an exemplary electronic entertainment system 300 that may be used to implement embodiments of the present invention.

FIG. 3 illustrates a block diagram of an exemplary electronic entertainment system 300 that may be used to implement embodiments of the present invention. The electronic entertainment system 300 as illustrated in FIG. 3 may correspond to console 110 of FIG. 1 and may include a main memory 302, a central processing unit (CPU) 304, graphic processor 306, an input/output (I/O) processor 308, a controller input interface 310, a hard disc drive or other storage component 312 (which may be removable), a communication network interface 314, a virtual reality interface 316, sound engine 318, and optical disc/media controls 320. Each of the foregoing are connected via one or more system buses 322.

Electronic entertainment system 300 as shown in FIG. 3 may be an electronic game console. The electronic entertainment system 300 may alternatively be implemented as a general-purpose computer, a set-top box, a hand-held game device, a tablet computing device, or a mobile computing device or phone. Electronic entertainment systems may contain some or all of the disclosed components depending on a particular form factor, purpose, or design.

Main memory 302 stores instructions and data for execution by CPU 304. Main memory 302 can store executable code when the electronic entertainment system 300 is in operation. Main memory 302 of FIG. 3 may communicate with CPU 304 via a dedicated bus. Main memory 302 may provide pre-stored programs in addition to programs transferred through the I/O processor 308 from hard disc drive/ storage component 312, a DVD or other optical disc (not shown) using the optical disc/media controls 320, or as might be downloaded via communication network interface 314.

The graphics processor 306 of FIG. 3 (or graphics card) executes graphics instructions received from the CPU 304 to produce images for display on a display device (not shown). The graphics processor 306 of FIG. 3 may transform objects from three-dimensional coordinates to two-dimensional coordinates, and vice versa. Graphics processor 306 may use ray tracing to aid in the rendering of light and shadows in a game scene by simulating and tracking individual rays of light produced by a source. Graphics processor 306 may utilize fast boot and load times, 4K-8K resolution, and up to 120 FPS with 120 hz refresh rates. Graphics processor 306 may render or otherwise process images differently for aspecific display device.

I/O processor 308 of FIG. 3 may also allow for the exchange of content over a wireless or other communications network (e.g., IEEE 802.x inclusive of Wi-Fi and Ethernet, 3G, 4G, LTE, and 3G mobile networks, and Bluetooth and short-range personal area networks). The I/O processor 308 of FIG. 3 primarily controls data exchanges between the various devices of the electronic entertainment system 300 including the CPU 304, the graphics processor 306, controller interface 310, hard disc drive/storage component 312, communication network interface 314, virtual reality interface 316, sound engine 318, and optical disc/ media controls 320.

A user of the electronic entertainment system 300 of FIG. 3 provides instructions via a controller device communicatively coupled to the controller interface 310 to the CPU 304. A variety of different controllers may be used to receive the instructions, including handheld and sensor-based controllers (e.g., for capturing and interpreting eye-tracking-based, voice-based, and gestural commands). For example, a controller device may include switches, buttons, accelerometers, sensors, processors, radios, display elements, etc., to receive instructions or input from the user, which may then be provided to controller interface 310 and then to CPU 304 for interpretation and execution. The instructions may further be used by the CPU 304 to control other components of electronic entertainment system 300. For example, the user may instruct the CPU 304 to store certain game information on the hard disc drive/storage component 312 or other non-transitory computer-readable storage media. A user may also instruct a character in a game to perform some specified action, which is rendered in conjunction with graphics processor 306, inclusive of audio interpreted by sound engine 318.

Hard disc drive/storage component 312 may include removable or non-removable non-volatile storage medium. Saud medium may be portable and inclusive of digital video disc, Blu-Ray, or USB coupled storage, to input and output data and code to and from the main memory 302. Software for implementing embodiments of the present invention may be stored on such a medium and input to the main memory via the hard disc drive/storage component 312. Software stored on hard disc drive/storage component 312 may also be managed by optical disk/media control 320 and/or communications network interface 314.

Communication network interface 314 may allow for communication via various communication networks, including local, proprietary networks and/or larger wide-area networks such as the Internet. The Internet is a broad network of interconnected computers and servers allowing for the transmission and exchange of Internet Protocol (IP) data between users connected through a network service provider. Examples of network service providers include public switched telephone networks, cable or fiber services, digital subscriber lines (DSL) or broadband, and satellite services. Communications network interface allows for communications and content to be exchanged between the various remote devices, including other electronic entertainment systems associated with other users and cloud-based databases, services and servers, and content hosting systems that might provide or facilitate game play and related content.

Virtual reality interface 316 allows for processing and rendering of virtual reality, augmented reality, and mixed reality data. This includes display devices such that might be partial or entirely immersive virtual environments. Virtual reality interface 316 may allow for exchange and presentation of immersive fields of view and foveated rendering in coordination with sounds processed by sound engine 318 and haptic feedback.

Sound engine 318 executes instructions to produce sound signals that are outputted to an audio device such as television speakers, controller speakers, stand-alone speakers, headphones or other head-mounted speakers. Different sets of sounds may be produced for each of the different sound output devices. This may include spatial or three-dimensional audio effects.

Optical disc/media controls 320 may be implemented with a magnetic disk drive or an optical disk drive for storing, managing, and controlling data and instructions for use by CPU 304. Optical disc/media controls 320 may be inclusive of system software (an operating system) for implementing embodiments of the present invention. That system may facilitate loading software into main memory 302.

Figure 4:
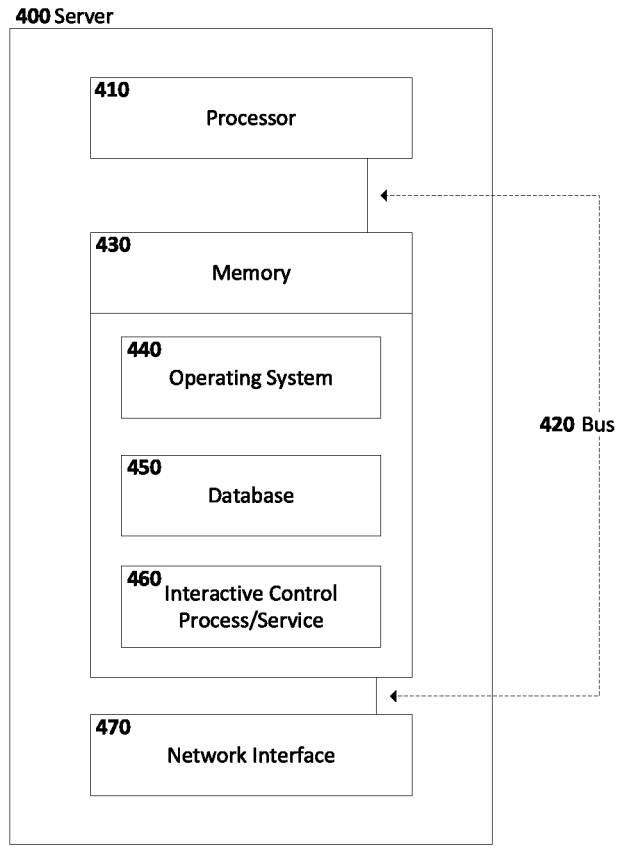
FIG. 4 illustrates a block diagram of an exemplary device configured to perform a method for tailoring in-game dialogue or interactions with non-player characters (NPCs).

FIG. 4 illustrates a block diagram of an exemplary server 400 configured to perform a method for tailoring in-game dialogue or interactions with non-player characters (NPCs). Server 400 may be remote from console 110 (and/or entertainment system 300), but may be in communication via communication network 130 to provide various data and services in support of various activities during interactive and gameplay sessions. As provided herein, server 400 may execute applicable instructions to tailor and provide in-game dialogue or interactions with NPCs to the user device. Such dialogue may be part of custom scripts and may further be associated with custom action options provided to animate the NPC or to the player for selection. As illustrated, server 400 may include a processor 410, an interconnecting bus 420, a memory 430 (including operating system 440, database(s) 450, and interactive control process/service 460), and network interface 470.

Processor 410—which may be similar to CPU 304 of FIG. 3—may include necessary elements or logic adapted to execute the software programs and manipulate data structures in memory 430 (including from database 450 in memory 430). For example, processor 410 can include one or more programmable processors, e.g., microprocessors or microcontrollers, or fixed-logic processors. In the case of a programmable processor, any associated memory, e.g., memory 430, may be any type of tangible processor readable memory, e.g., random access, read-only, etc., that is encoded with or stores instructions that can implement program modules, e.g., a module having interactive control process/service 460 encoded thereon. Processor 410 can also include a fixed-logic processing device, such as an application specific integrated circuit (ASIC) or a digital signal processor that is configured with firmware including instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that includes fixed digital logic, or a combination thereof. In general, any process logic may be embodied in a processor or computer readable medium that is encoded with instructions for execution by the processor that, when executed by the processor, are operable to cause the processor to perform the functions described herein. Interconnecting bus 420 may correspond to bus 322 of FIG. 3 and allow for various components of server 400 to communicate and exchange data.

Memory 430 may include a plurality of storage devices having locations addressable by processor 410 for storing software programs and data structures associated with the embodiments described herein. As illustrated, memory 430 may include operating system 440, database(s) 450, and interactive control process/service 460.

An operating system 440, portions of which are typically resident in memory 430 and executed by processor 410, functionally organizes the device by, inter alia, invoking operations in support of software processes and/or services executing on the device.

The databases 450 may be stored on the same server 400 or on multiple different servers 400, or on any of the user devices (e.g., console 110 or entertainment system 300) that may be used to implement any part of the NPC customization. Databases 450 may store game and other media, information regarding the specific game or content title (e.g., game characters including NPCs, game objectives, requirements, rules, dialogues, scripts, in-game actions and behaviors), historical gameplay or interactive data (e.g., object files or activity files), associated metadata, user profiles, trained learning models, past custom NPCs, and associated customization data. Each interactive title may include depictions of one or more objects (e.g., avatars, characters, activities, etc.) that a user can interactive with and/or UGC (e.g., screen shots, videos, commentary, mashups, etc.) created by peers, publishers of the content titles and/or publishers. Such data may include metadata by which to label subsets for supervised and unsupervised learning techniques. Similarly, one or more user profiles may also be stored in the databases 450. Each user profile may include information about the user (e.g., user progress in an activity and/or media content title, user id, user game characters, etc.) and may be associated with one or more media titles and engagement thereof. Such data in databases 450 may be continually updated as a user continues to engage in new sessions and produce new session data regarding various interactions that have taken place therein. The updated user data may be incorporated into or otherwise used to train a learning model to refine and make better and more nuanced predictions for the specific user.

Software processes and/or services provided by server 400 may include execution of one or more interactive control process(es)/service(s) 460. Note that while interactive control process/service 460 is shown in centralized memory 430, it may be configured to operate in a distributed network of multiple servers 400 and/or other devices. An exemplary service that may include tailoring or customization of NPC interactions to a specific user across one or more different interactive content titles. For example, speech patterns or behavioral patterns of the user may be used to modify NPC dialogue and actions to enhance immersion, comfort, interest, excitement, joy, and/or other types of engagement factors of the user experience.

Network interface(s) 470 contain mechanical, electrical, and signaling circuitry for communicating data between devices over a network such as communication network 130. Network interface 170 may communicate with such devices as user devices (e.g., console 110 or entertainment system 300), remote database, other servers 400, etc. Network interface 470 may include hardware and associated software for communicating with each of the remote devices. Such data communicated to and from network interface 470 may include user data, game data (including user commands, sensor-detected movement, verbalization, or gestures) and may also be configured to provide session data and feedback (e.g., tactile, visual, audio, etc.).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Figure 5:
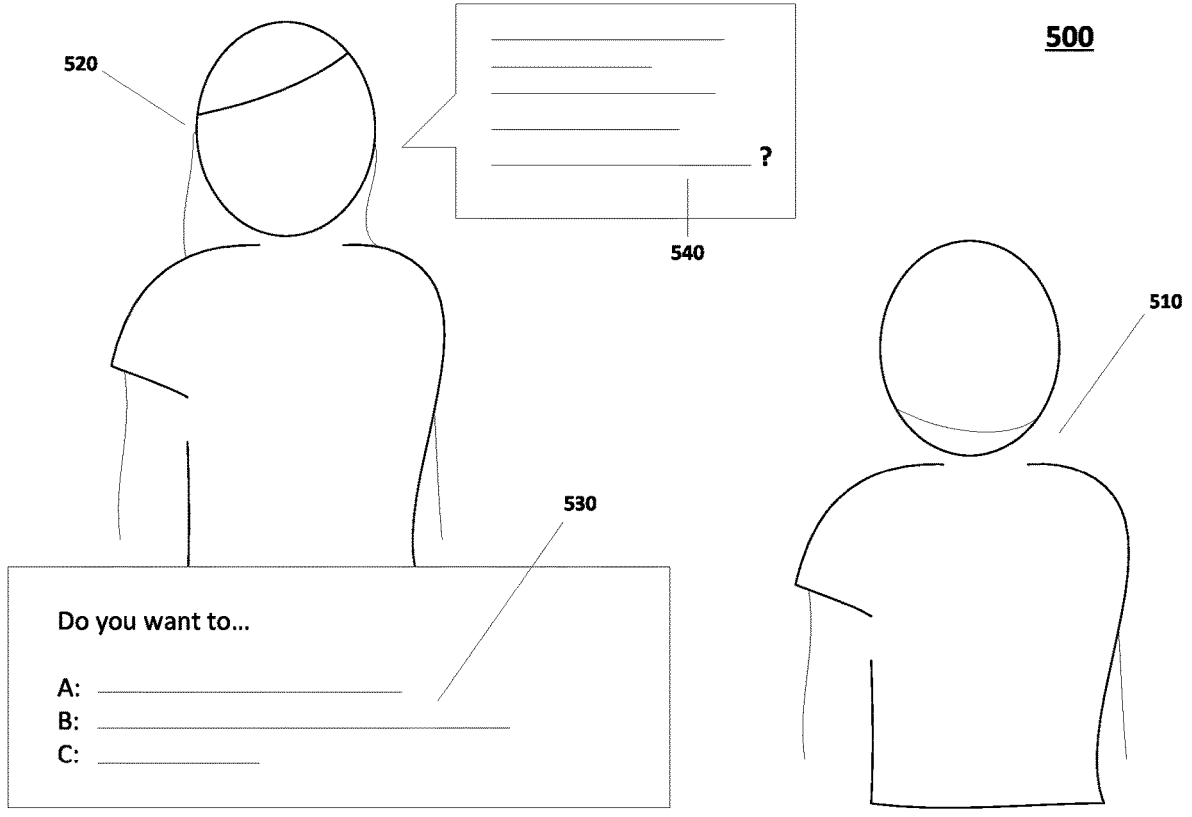
FIG. 5 illustrates an exemplary display of tailored dialogue that may be displayed to a user in accordance with embodiments of the present invention.

FIG. 5 illustrates an exemplary display of tailored dialogue that may be displayed to a user in accordance with embodiments of the present invention. The in-game environment 500 may be displayed to the user 105 on display 150. The avatar 510 of the user 105 is engaged with an interaction with the NPC 520. The customized interaction may include modifying one or more the action options 530 provided to the user based on the player attribute of the user. The action options 530 may include different options for engaging with the NPC 520 as described in FIG. 2.

The customizations may be discussed in relation to NPC 520, but may also apply to the avatar 510 of the user 105. A customized interaction may include modifying the appearance of the NPC 520 based on the appearance of the user 105 received in the activity file. Such modification may be made to be more similar to the user or associated avatar (e.g., to enhance trust, comfort, or relatability) or different from the user or associated avatar (e.g., for ease of differentiation during hectic onscreen activities).

The customized interaction may further include modifying the voice profile or speech patterns of the NPC 520 based on the voice pattern of the user indicated by data recorded in the activity file. The customized interaction may further include modifying the dialogue/script 540 or action options of the NPC 520. Based on user reactions or action selection from among the action options 530 by the user, a user attribute (and profile) of the user may be updated and the subsequent available action options 530 may be further modified. Similarly, based on the selection of the action among the action options 530 by the user, subsequent dialogue/script 540 of NPC 520 may be further modified. As more user data may be accumulated over time, therefore, such user data may be used to train the associated learning model to continually improve NPC customizations for the user as the user grows, learns, and/or otherwise evolves their preferences and predilections over time.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:

storing user data in memory regarding a plurality of different user attributes, each user attribute associated with a different pattern of in-game engagement included in a set of patterns and an in-game customization;

receiving user profile data that includes sensor data captured during in-game engagement by a user of a user device with one or more non-playable characters in one or more game sessions;

identifying, based on the stored user data and the sensor data, a pattern of engagement exhibited by the user;

assigning a user attribute from the plurality of different user attributes to the user based on the identified pattern of engagement matching a stored pattern included in the set of patterns; and generating instructions for customizing an interaction with a non-playable character during a current game session with the user device, wherein the interaction is customized in accordance with one or more modified action options that corresponds to modified dialogue options presented by the user device based on the assigned user attribute.

2. The method of claim 1, wherein the user profile data includes one or more activity files that store data from one or more sensors during the in-game engagement.

3. The method of claim 2, wherein the sensors include one or more cameras, and wherein data from the one or more cameras includes images of a visual appearance of the user during the in-game engagement.

4. The method of claim 3, wherein the images include one or more physical gestures made by the user during the in-game engagement.

5. The method of claim 2, wherein the sensors include one or more microphones, and wherein data from the one or more microphones includes recorded sounds made by the user in relation to the non-playable character.

6. The method of claim 1, further comprising aggregating subsets of the stored user data regarding sets of actions indicative of similar attribute to be for identifying a second pattern of engagement.

7. The method of claim 1, further comprising generating a sound wave profile of voice characteristics of the user from one or more voice recordings associated with the user profile data, wherein assigning the user attribute is based on the sound wave profile.

8. The method of claim 1, wherein assigning the user attribute includes weighting one or more factors regarding the in-game engagement.

9. The method of claim 1, further comprising assigning a different user attribute to a different in-game engagement by the user with a different non-playable character, and updating the user profile data based on the different assigned user attribute.

10. The method of claim 1, wherein the modified action options include modified tonality of the modified dialogue options presented within a display of the user device during the interaction with the non-playable character based on the user attribute.

11. The method of claim 1, wherein at least one of the modified dialogue options is part of a modified script generated for the interaction with the non-playable character.

12. The method of claim 1, wherein the instructions are executable to modify a voice characteristic of the non-playable character or an avatar of the user during the in-game engagement.

13. The method of claim 12, wherein the instructions are executable to modify a gesture made by the non-playable character or the avatar of the user.

14. The method of claim 1, providing a customized interaction with the non-playable character further include modifying an appearance of the non-playable character or an avatar of the user during the in-game engagement.

15. The method of claim 1, further comprising receiving a user selection of an action option from the modified action options, wherein the interaction with the non-playable character is customized in accordance with instructions associated with the action option.

16. The method of claim 15, further comprising updating the user profile data based on the user selection.

17. A system comprising:

memory that stores user data regarding a plurality of different user attributes, each user attribute associated with a different pattern of in-game engagement included in a set of patterns and an in-game customization;

a communication interface that communicates over a communication network with a user device, wherein the communication interface receives user profile data that includes sensor data captured during in-game engagement by a user of the user device with one or more non-playable characters in one or more game sessions; and a processor that executes instructions stored in memory, wherein the processor executes the instructions to:

identify, based on the stored user data and the sensor data, a pattern of engagement exhibited by the user, assign a user attribute from the plurality of different user attributes to the user based on the identified pattern of engagement matching a stored pattern included in the set of patterns, and generate instructions for customizing an interaction with a non-playable character during a current game session with the user device, wherein the interaction is customized in accordance with one or more modified action options that corresponds to modified dialogue options presented by the user device based on the assigned user attribute.

18. A non-transitory computer-readable storage medium, having embodied thereon a program executable by a processor to perform a method comprising:

storing user data in memory regarding a plurality of different user attributes, each user attribute associated with a different pattern of in-game engagement included in a set of patterns and an in-game customization;

receiving user profile data that includes sensor data captured during in-game engagement by a user of a user device with one or more non-playable characters in one or more game sessions;

identifying, based on the stored user data and the sensor data, a pattern of engagement exhibited by the user;

assigning a user attribute from the plurality of different user attributes to the user based on the identified pattern of engagement matching a stored pattern included in the set of patterns; and generating instructions for customizing an interaction with a non-playable character during a current game session with the user device, wherein the interaction is customized in accordance with one or more modified action options that corresponds to modified dialogue options presented by the user device based on the assigned user attribute.

19. The system of claim 17, wherein the user profile data includes one or more activity files that store data from one or more sensors during the in-game engagement.

20. The system of claim 19, further comprising the sensors comprising at least one of a microphone or a camera.

* * * * *